Patented June 30, 1931

1,812,693

UNITED STATES PATENT OFFICE

ANTHONY JAMES HAILWOOD, OF BLACKLEY, MANCHESTER, ENGLAND, ASSIGNOR TO BRITISH DYESTUFFS CORPORATION LIMITED, OF MANCHESTER, ENGLAND

MANUFACTURE OF NEW DERIVATIVES FROM SULPHITE CELLULOSE WASTE

No Drawing. Application filed September 26, 1927, Serial No. 222,212, and in Great Britain December 21, 1926.

This invention relates to the conversion of ligninsulphonic acid into new and valuable products.

The dispersing properties of ligninsulphonic acid (sulphite cellulose waste) are well known. We have now discovered that by suitable treatment with ammonia solutions, preferably under pressure, ligninsulphonic acid yields new substances, which, while retaining the dispersing properties of the original starting product, possess new and more valuable properties, e. g., as highly protective colloids, being particularly suitable for addition to dispersed dye pastes which are to be dried to powder form as it enables such powders to retain the dispersed condition and inhibits the condensation to coarser aggregates of the dispersed particles. My new products also find application as tanning agents. The somewhat high color of the products originally obtained can be removed, if desired, by alkaline reduction. My new product contains in contradistinction to the initial material, nitrogen within the molecule.

The following example illustrates without limiting the scope of my invention:

*Example:* 36 parts of sulphite cellulose pitch, dissolved in 100 parts of water, are mixed with 50 parts of concentrated aqueous ammonia and the whole is heated in an autoclave for 12 hours at 110–120° C. During the reaction, sulphurous acid is split off and forms ammonium sulphite. The crude solution, preferably freed from ammonia by distillation, may be used direct, or may be evaporated to dryness. Alternatively, after removal of part or all of the ammonia, the solution may be acidified and the acid product filtered off and dried.

The somewhat high color of the products so obtained may, to a large extent, be removed by alkaline reduction. Thus, 15 parts of the acid products are dissolved in 100 parts of water containing 4 parts of caustic soda, and boiled with 3 parts of zinc dust for 2 hours. After acidifying and filtering, a much paler product is obtained.

What I claim and desire to secure by Letters Patent is:—

1. A process for the manufacture of new derivatives of ligninsulphonic acid (sulphite cellulose pitch) comprising the treatment of the same at temperatures above 110° C. with ammonia solution at pressure above atmospheric in a closed vessel.

2. As a new product, the body which may be obtained by treating sulphite cellulose pitch with concentrated ammonia in a closed autoclave for twelve hours at 110°–120° C. which is characterized by solubility in water, by containing nitrogen within the molecule and by possessing the property of causing insoluble dispersed dye pastes to retain their dispersed condition when dried in admixture with it.

3. A process for the manufacture of new derivatives from sulphite cellulose pitch consisting of heating to 110° C. sulphite cellulose pitch dissolved in water and mixed with aqueous ammonia in an autoclave for about twelve hours.

4. A process for the manufacture of new derivatives from sulphite cellulose pitch consisting of heating to above 110° C. sulphite cellulose pitch dissolved in water and mixed with aqueous ammonia at a pressure greater than atmospheric pressure, distilling off the ammonia and evaporating to dryness.

5. A process for the manufacture of a new derivative of ligninsulphonic acid (sulphite cellulose pitch) comprising the treatment of the same at a temperature above 110° C. with ammonia solution at a pressure above atmospheric in a closed vessel and subjecting the product to an alkaline reduction.

In testimony whereof I have signed my name to this specification.

ANTHONY JAMES HAILWOOD.